2,997,440
HIGH TEMPERATURE EMULSION DRILLING FLUID

Duane B. Anderson, Tulsa, Okla., assignor to Pan American Petroleum Corporation, Tulsa, Okla., a corporation of Delaware
No Drawing. Filed June 17, 1959, Ser. No. 820,847
8 Claims. (Cl. 252—8.5)

This invention relates to emulsion drilling fluids. More particularly, it relates to emulsion drilling fluids suitable for use in drilling wells in deep, high-temperature earth formations.

U.S. Patent No. 2,661,334, issued to James L. Lummus on December 1, 1953, describes and claims an emulsion drilling fluid which has enjoyed considerable commercial success in drilling, completing and working-over wells in many areas. It has been found, however, that the ability of this drilling fluid to suspend and lift bit cuttings and finely divided solid weighting agents in deep high-temperature wells is not as good as might be desired when the temperature is about 200° F., and the drilling fluid is exposed to the high temperature for several hours. The fluid loss rate of the drilling fluid, as measured by the standard A.P.I. method, also sometimes increases after exposure to high temperatures for extended periods of time. The problem is particularly severe when a phosphatide, such as lecithin, is used as the oil-soluble emulsifying agent of the composition.

Other water-in-oil emulsion drilling fluids also seem to be subject to the same difficulties. High temperatures are known to change the properties of emulsions even if the emulsifying agents remain chemically stable. In addition, some emulsifiers, such as the phosphatides and other esters, tend to become hydrolyzed, or otherwise decompose at elevated temperatures. This still further changes the properties of the emulsions. Therefore, variations in fluid loss properties and solids suspending abilities of the emulsion drilling fluids due to the effects of high temperatures are common.

The principal object of this invention is to provide a means for extending the range of temperatures at which emulsion drilling fluids can be used. A further object is to extend the period of time duing which an emulsion drilling fluid can be exposed to elevated temperatures before its properties become seriously harmed. Other objects will be apparent to those skilled in the art from the following description and claims.

I have found that the effects of high temperatures on emulsion drilling fluids can be greatly minimized by the addition of a limited amount of hydrogenated castor oil. This materal is also sometimes called 12-hydroxy stearin.

The stabilizing abilities of several additives were tested by preparing samples of emulsion drilling fluids containing the additives and heating the samples in cylinders placed in a steam bath. For these tests, the drilling fluid contained the following ingredients:

23.1 gallons of oil
18.9 gallons of saturated salt water
60 pounds of commercial No-Blok concentrate
500 pounds barite The No-Blok concentrate contained an oil-soluble emulsifier and a water-soluble emulsifier as specified in U.S. Patent No. 2,661,334. The oil-soluble emulsifier was commercial lecithin. The water-soluble emulsifier was Sterox CD, which is ethoxylated tall oil acids containing about 12 moles of ethylene oxide per mole of acid. The emulsifiers in the concentrate were mixed with sufficient clay to form a dry, free-flowing powdered product.

The oil in some cases was diesel fuel; in others, it was a light lubricating oil having a viscosity of about 40 or 50 centipoises at 80° F.

The cylinders used for testing drilling fluids in the steam baths were fabricated from 30-inch lengths of 1½-inch pipe. The cylinders were equipped with removable ends, a vent valve at the top, and three side taps so placed that 20 percent of the fluid was above the top tap, 35 percent was contained between both the top and middle, and middle and bottom taps, and the final 10 percent trapped below the bottom tap.

In each test approximately 1000 ml. of the 15.5 pounds per gallon base emulsion were prepared. Treating agents to be evaluated were then added to the emulsion. A sample of untreated emulsion was used as the control. The treated emulsions and control sample were then placed in test cylinders. The volume in each case was 990 ml. which allowed 5 percent air space for expansion. The cylinders, sealed at 80° F. and atmospheric pressure, were then placed in a steam bath and surrounded by saturated steam at the pressure desired. Upon completion of the test, the cylinders were air cooled to 80° F., vented, and the fluid was drained out of the side taps in order from top to bottom. Any mud which did not flow out readily was forced out with a rubber piston. The bottom cap on each cylinder was then removed and the mud contained between it and the lowest side tap examined; this material was then mixed with the material obtained from the lowest side tap before weighing. (The volume was too small to fill a mud balance.) The three separate portions of the sample were weighed, the emulsion appearance noted, and in some instances the fluid loss measured.

Results of the tests are reported in the following table:

TESTS 1 TO 10 USED DIESEL FUEL AS THE OIL IN THE EMULSION MUD

| Test No. | Additive Type | Lb./bbl. | Aging cond. Days | Aging cond. °F. | Densities Top | Densities Mid. | Densities Bot. | Fluid loss, cc./30 min. |
|---|---|---|---|---|---|---|---|---|
| 1 | None | | 3 | 265 | (¹) | (¹) | (¹) | 8.8 |
| 2 | Additive A | 3 | 3 | 265 | (¹) | (¹) | (¹) | 1.5 |
| 3 | ----do---- | 5 | 3 | 265 | 11.0 | 11.9 | 18+ | |
| 4 | Partially esterified styrene copolymer | 4 | 3 | 265 | (¹) | (¹) | (¹) | 1.3 |
| 5 | Partially esterified styrene copolymer dimethyl dicoco ammonium chloride | 4 1.4 | 3 | 265 | (¹) | (¹) | (¹) | 13.0 |
| 6 | Limed rosin dimethyl disoy ammonium chloride | 7 0.7 | 3 | 265 | 10.8 | 12.2 | 18+ | |
| 7 | Additive B | 1.5 | 3 | 265 | 13.4 | 14.8 | 16.2 | 0.0 |
| 8 | Partially esterified styrene copolymer dimethyl dicoco ammonium chloride | 7 0.7 | 7 | 265 | 8.6 | 13.3 | 18+ | 14.0 |
| 9 | Hydrogenated castor oil | 2 | 7 | 265 | 11.8 | 15.0 | 17.4 | 3.4 |
| 10 | ----do---- | 3 | 7 | 265 | 9.1 | 13.4 | 18+ | 8.0 |

See footnote at end of table.

TESTS 11 TO 22 USED LIGHT LUBRICATING OIL IN THE EMULSION

| Test No. | Additive | | Aging cond. | | Densities | | | Fluid loss, cc./ 30 min. |
|---|---|---|---|---|---|---|---|---|
| | Type | Lb./bbl. | Days | °F. | Top | Mid. | Bot. | |
| 11 | None | | 3 | 265 | 13.9 | 15.2 | 16.2 | 1.2 |
| 12 | Additive A | 3 | 3 | 265 | 14.6 | 15.3 | 15.8 | 0.7 |
| 13 | Dimethyl dicoco ammonium chloride | 0.5 | 3 | 265 | 12.6 | 16.0 | 16.4 | 3.5 |
| 14 | Sodium resinate | 1.7 | 3 | 265 | (¹) | (¹) | (¹) | |
| 15 | Additive B | 0.4 | 3 | 265 | 13.7 | 14.8 | 16.7 | 0.1 |
| 16 | do | 1.0 | 3 | 265 | 15.4 | 15.4 | 15.6 | 0.7 |
| 17 | do | 1.0 | 21 | 265 | 12.4 | 16.1 | 16.9 | |
| 18 | do | 1.0 | 35 | 265 | 13.0 | 15.8 | 16.5 | |
| 19 | do | 1.0 | 42 | 265 | 7.7 | 15.5 | 18.7 | 2.0 |
| 20 | do | 1.0 | 1 | 365 | 15.2 | 15.2 | 15.7 | |
| 21 | do | 1.0 | 14 | 365 | 13.7 | 15.5 | 16.0 | 2.8 |

¹ Emulsion broke.

In the table, additive A is a material of unknown composition developed by a drilling fluid supply company as a suspending agent for finely divided solids, such as barite, in oil base and emulsion drilling fluids. The partially esterified styrene copolymer is an additive used in paints as a pigment suspending agent and emulsion stabilizer. In tests 5 and 6, the terms, "dicoco" and "disoy" mean that in the quaternary ammonium compounds two of the hydrocarbon radicals associated with the nitrogen atom were derived from coconut oil and soy bean oil, respectively. Additive B is a combination of about 20 percent by weight of hydrogenated castor oil, about 55 percent by weight of a light mineral oil, and about 25 percent by weight of a high molecular weight hydrocarbon wax, such as paraffin or polyethylene.

The results of the first test illustrate the problem. In tests 2, 4 and 5, the failure of known emulsion stabilizers and pigment suspending agents to solve the problems is to be noted. They did not even prevent breaking of the emulsion. In test 3, a very high concentration of the copolymer prevented breaking of the emulsion, but permitted serious settling of the weighting agent. The emulsion samples from the top and middle sections of the heated chamber had densities far below the original 15.5 pounds per gallon, while the sample from the bottom section obviously contained most of the weighting agent, since it weighed more than 18 pounds per gallon. The same is true of the additive in test 6.

In test 7, additive B obviously did a much better job of preventing loss of ability of the drilling fluid to suspend the weighting agent. In addition, the fluid loss value remained zero. In this connection, it should be noted that all the fluid loss values were measured after the three samples from the top, bottom and middle of the test chamber had been re-mixed and stirred thoroughly after the heating tests. Thus, changes in the fluid loss values represent permanent changes in the emulsion properties and not merely temporary effects of heating.

In considering tests 8, 9 and 10, it should be noted that the aging time was seven days rather than three days, as in tests 1 through 7. In spite of the longer aging time at high temperatures, the high concentration of the agent used in test 8 was able to maintain some degree of emulsion stability. Serious settling occurred, however, and a high fluid loss value showed the emulsion properties had been badly changed.

A comparison of tests 9 and 10 shows that if more than about 2 pounds of hydrogenated castor oil is used per barrel of emulsion drilling fluid, the properties of the drilling fluid are adversely affected. Test 9 shows that the drilling fluid in the middle section of the test chamber maintained almost the same density after heating as at the start. Even in the bottom section, the density did not increase to a value above 18 pounds per gallon. It will thus be apparent that hydrogenated castor oil, preferably in concentrations considerably below 2 pounds per barrel of drilling fluid, preserves the suspending ability of the drilling fluid. It will also be apparent that this additive is effective in maintaining the low fluid loss properties of emulsion drilling fluids.

In tests 11 to 21, a light lubricating oil was used in place of the diesel fuel employed in the first 10 compositions. The results of test 11 show the surprising ability of this slightly more viscous oil to make the emulsion mud resistant to the effects of temperature. A comparison of test 11 to test 7 shows that the more viscous oil was able to produce all the stabilizing effects of the best additive, except the low fluid loss.

In test 12, additive A is shown to improve the ability of the viscous oil to stabilize the emulsion against the effects of high temperature for short periods of time. Tests 13 and 14 show that not all the suspending and thickening agents can be used effectively with the thicker oil. The quaternary ammonium compound used in test 13 increased the settling rate of weighting agents and increased the fluid loss, while the sodium resinate used in test 14 actually broke the emulsion.

Test 15 shows that as little as 0.4 pound of additive B per barrel of drilling fluid helps the fluid loss of emulsion drilling fluids, but has little effect on the solids suspending abilities of the emulsion if the light lubricating oil is employed as the oil phase. Since additive B contains only about 20 percent hydrogenated castor oil, this test shows that as little as about ¹⁄₁₀ pound per barrel of this material has some beneficial effects on emulsion drilling fluids. Test 16 shows the improved effects of higher concentrations of the hydrogenated castor oil on the weight-suspending properties of the emulsion. Again, however, the higher concentrations had a slightly adverse effect on the fluid loss properties of the drilling fluid.

Tests 17, 18 and 19 demonstrate the long term high temperature stability of the emulsion drilling fluid made with light lubricating oil, and containing hydrogenated castor oil. At the end of 35 days, no serious settling had occurred. After 42 days, however, it is apparent that the emulsion was beginning to break, since the density of the fluid in the top section of the test chamber shows that it was substantially completely oil. Upon re-mixing fluids in the three sections of the test chamber, a stable emulsion was produced having a fluid loss of only 2.0 cc. in the standard A.P.I. test.

Tests 20 and 21 show that the combination of light lubricating oil and hydrogenated castor oil were able to stabilize an emulsion mud against the effects of even a temperature of 365° F. for 14 days. After this length of time, however, decomposition of the lecithin resulted in breaking of the emulsion. To obtain a satisfactory emulsion upon reblending of the test chamber contents after this time, it was necessary to mix in additional lecithin. With the added lecithin, however, the emulsion drilling fluid had acceptable properties even after 35 days at 365° F. Serious settling occurred after about 14 days. Therefore the drilling fluid should not be allowed to stand quiescent at 365° F. for more than about two weeks. If the drilling fluid is being circulated, however, so that additional emulsifiers can be added occasionally, continued use at 365° F. is possible.

The hydrogenated castor oil may be added directly to an emulsion mud as a powdered solid. Mixing of the drilling fluid and additive by means of mechanical stirrers, mud guns, or the like, will then disperse the additive in the drilling fluid to a sufficient degree to permit it to be carried through the mud pumps and be circulated through the well. The pumping and circulation will further disperse the additive. Preferably, however, the hydrogenated castor oil should be dispersed in oil to form a paste or viscous solution, before its addition to the drilling fluid. The paste or solution disperses readily in the external phase of water-in-oil emulsion drilling fluids to produce results somewhat superior to those produced by the additive introduced in a solid state. The superior results of additive B, as shown in the table, are partly due to this effect.

The other factor accounting for the superior results of additive B is the presence of a waxy solid, such as polyethylene. This material improves the action of the hydrogenated castor oil, particularly at the higher temperatures. Therefore, the preferred form for hydrogenated castor oil as an additive for water-in-oil emulsion drilling fluids is as a blend with polyethylene and a mineral oil solvent. The composition is preferably prepared by blending the three ingredients together at a temperature near the softening point of the polyethylene. The three-component blend can be mixed easily and thoroughly with a water-in-oil emulsion drilling fluid, since the resulting paste or liquid is readily dispersible in the oil phase. My preferred drilling fluid is a composition falling within the limits defined in U.S. Patent 2,661,334. More specifically, a preferred composition is as follows:

Light lubricating oil_____ 45 parts by volume of liquids
Saturated salt water_____ 55 parts by volume of liquids
Commercial lecithin___ 8 pounds per barrel of emulsion
Ethoxylated tall oil____ 2 pounds per barrel of emulsion
Ground oyster shells__ 20 pounds per barrel of emulsion
Hydrogenated caster oil_ 1 pound per barrel of emulsion While the action of the hydrogenated castor oil has been illustrated in connection with particular emulsions, it is also applicable to others. An example of another drilling fluid is the water-in-oil emulsion drilling fluid described in U.S. Patent 2,793,996, issued to James L. Lummus on May 28, 1957. Still other drilling fluids to which the inert hydrogenated castor oil is applicable will be apparent to those skilled in the art.

I claim:

1. An emulsion drilling fluid suitable for use in drilling high-temperature formations consisting essentially of from about 40 to about 75 parts by volume of water, and from about 25 to about 60 parts by volume of oil, said emulsion drilling fluid also containing at least about 2.5 pounds per barrel of a phosphatide, said emulsion drilling fluid containing at least about 0.1 pound per barrel of a water-soluble, non-ionic, surface active agent, and said emulsion drilling fluid also containing from about $\frac{1}{10}$ to about 2 pounds of hydrogenated castor oil per barrel of emulsion drilling fluid.

2. The drilling fluid of claim 1 in which said water-soluble surface active agent is an ester of a carboxylic acid and a polyoxyethylene chain, said acid having from about 12 to about 20 carbon atoms per molecule, and said polyoxyethylene chain having from about 10 to about 30 oxyethylene groups.

3. The drilling fluid of claim 1 in which said oil is a refined petroleum fraction having a viscosity of about 40 to about 50 centipoises at a temperature of about 80° F.

4. In the method of drilling a well through high-temperature formations in which method a water-in-oil emulsion drilling fluid is circulated in the well to perform the usual functions of drilling fluids, the improvement comprising using as said drilling fluid the composition of claim 1 whereby the period of time is increased during which said drilling fluid can be exposed to the elevated temperatures before its properties become seriously harmed.

5. An emulsion drilling fluid suitable for use in drilling high-temperature formations consisting essentially of from about 40 to about 75 parts by volume of an aqueous salt solution and from about 25 to about 60 parts by volume of oil; said emulsion drilling fluid containing at least 2.5 pounds per barrel of a phosphatide; said emulsion drilling fluid containing at least 0.1 pound of a water-soluble, non-ionic, surface-active agent per barrel of emulsion; and said emulsion drilling fluid containing from about $\frac{1}{10}$ to about 2 pounds of hydrogenated castor oil per barrel of said emulsion drilling fluid.

6. The drilling fluid of claim 5 in which said water-soluble surface-active agent is an ester of a carboxylic acid and a polyoxyethylene chain, said acid having from about 12 to about 20 carbon atoms per molecule, and said polyoxyethylene chain having from about 10 to about 30 oxyethylene groups.

7. The drilling fluid of claim 5 in which said oil is a refined petroleum fraction having a viscosity of about 40 to about 50 centipoises at a temperature of about 80° F.

8. In the method of drilling a well through high-temperature formations in which method a water-in-oil emulsion drilling fluid is circulated in the well to perform the usual functions of drilling fluids, the improvement comprising using as said drilling fluid the composition of claim 5 whereby the period of time is increased during which said drilling fluid can be exposed to the elevated temperatures before its properties become seriously harmed.

References Cited in the file of this patent

UNITED STATES PATENTS

| | | |
|---|---|---|
| 2,552,706 | Bertram | May 8, 1951 |
| 2,661,334 | Lummus | Dec. 1, 1953 |
| 2,702,787 | Freeland | Feb. 22, 1955 |
| 2,862,881 | Reddie | Dec. 2, 1958 |
| 2,876,197 | Watkins | Mar. 3, 1959 |